UNITED STATES PATENT OFFICE.

RUDOLPH D'HEUREUSE, OF NEW YORK, N. Y.

PROCESS OF PURIFYING WINE, BEER, &c.

SPECIFICATION forming part of Letters Patent No. 309,609, dated December 23, 1884.

Application filed May 24, 1884. (No specimens.)

*To all whom it may concern:*

Be it known that I, RUDOLPH D'HEUREUSE, a citizen of the United States, residing at New York, N. Y., have invented new and useful Improvements in Process of Purifying Wine, Beer, &c., of which the following is a specification.

My invention relates to the purification of wine, cider, beer, and vegetable juices and decoctions in general.

The object of the invention is to effect the removal of objectionable nitrogenous matter and impurities at the earliest possible stages of the manufacture of these articles, with the retention of the desirable properties and avoidance of unfavorable occurrences.

My invention consists in impregnating the liquid under treatment in a closed vessel with carbonic-acid gas under pressure of fifteen pounds and upward to the square inch above the ordinary atmospheric pressure; in retaining the liquid in a charged state until the objectionable matter has been rendered insoluble; and, finally, in removing the sedimentary matter.

The invention also consists in preceding the above-outlined process, under circumstances to be hereinafter explained, by impregnating the liquid with oxygen of the air or another source.

Wine, cider, beer, and other liquids of similar derivation generally clarify slowly, and if clear and bottled before perfect ripeness have the tendency to become turbid, deposit sediment, or decompose.

It is of the greatest industrial advantage to get the article ready for market in the shortest possible time with avoidance of the above-mentioned occurrences, all of which are due to the presence in the liquid of nitrogenous matter and organic impurities whose removal insures stability. Alcoholic fermentation in saccharine liquids is favored by an increase of pressure in the liquid beyond the ordinary atmospheric pressure. However, a pressure beyond a certain point, varying according to the substance and other conditions from twenty-five to upward of fifty pounds per square inch, retards and finally suppresses alcoholic fermentation by destroying the function of the organisms upon whose presence and activity the fermentation depends; but at the same time the elimination of formerly soluble nitrogenous matter in the liquid is favored and accelerated by an increase in the pressure employed. In like manner the deposition of organisms that are killed or rendered inactive by the pressure is hastened.

I commence the purifying operation according to my method at any convenient stage of fermentation of liquids subjected to that process, or after fermentation has ceased, while those liquids not to be fermented are prevented from entering that state by the immediate commencement of the purifying operation after their production. The initial step in my process in most cases is the impregnation of the liquid, which is held in a closed vessel, with carbonic-acid gas under a pressure suitable to the character and condition of the liquid under treatment, and if further attenuation of the saccharine components by fermentation is still needed the pressure is not raised so high as to impair fermentation until the process is accomplished, when the pressure is increased to bar further fermenting action. The required pressure then applied is kept up sufficiently high to secure the full benefits desired, in many cases requiring upward of fifty (50) pounds per square inch pressure to speedily accomplish the desired result.

The impregnation of the liquid with carbonic-acid gas is usually effected in my process by agitation of the liquid while the gas fills the vessel in which the liquid is contained. This agitation is preferably accomplished by means of a revolving shaft situated in the vessel in which the liquid is contained and provided with projecting arms, which act upon the beer, &c., to insure the contact of every portion of the liquid with the gas, which is preferably introduced at the bottom; but it is obvious that various other modes may be employed for the purpose with convenience and expediency without materially changing the results of the operations. For instance, the liquid may be forced into the impregnator through the gas, or with the gas under pressure. The accumulation of the gas generated in the fermentation of the liquid under treatment, or of other liquid, or some other method, like impelling currents of the gas through perforated pipes near the bottom, may be used simultaneously. In my process the liquid is only required to be kept under pressure for from a few hours to two or three days at the maximum to effect the entire removal of all objectionable impurities.

In liquids not sufficiently exposed to the oxidizing action of the oxygen during the process of manufacture, so as to predispose the nitrogenous impurities to the eliminating action of the gas treatment—for instance, beer constantly kept in an atmosphere of carbonic-acid gas—it is of signal advantage for expediting the desired elimination, to preparatorily impregnate the liquid under agitation with oxygen of the air or pure oxygen previous to subjecting it to the final treatment with carbonic-acid gas.

It is obvious that the impregnation with oxygen should not be continued long enough to induce injurious effects, and according to the character of the liquid and conditions of temperature may be accomplished in shorter or longer time, when it is followed by the treatment with carbonic-acid gas.

The application of the oxygen is effectually and surely accomplished by forcing currents of pure air or oxygen through the liquid from below in a divided state, thereby expelling the carbonic-acid gas in the beer and temporarily taking its place, while by the subsequent impregnation with carbonic-acid gas this in turn replaces the oxygen whose intended function is accomplished.

The impregnation with oxygen can be accomplished in other ways. For instance, the gas is exhausted from the closed vessel in which the beer is contained by an exhaust device, while at the same time air or oxygen is admitted preferably at the bottom and rises through the beer, &c., and impregnates it.

As to the temperature employed in the operation, it can be stated as a rule that in the treatment of unfermented liquids a temperature of 130° to 180° Fahrenheit is mostly used for the whole or part of the process, while for fermented liquids the temperature now ordinarily used in their several manipulations is employed.

When tests establish the fact that the objectionable organic and nitrogenous matters of the liquid under treatment have been rendered insoluble, they are removed by filtration or deposition, preferably by filtration, which may be done while the liquid is still under pressure, and the bright clear liquid resulting is then ready for bottling or use.

If it is desired to use the article in a highly-charged effervescent condition the required amount of carbonic acid is retained in the liquid by well-known modes of drawing, and any excess of gas beyond the quantity subsequently required can be recovered to do service many times over.

Frequently it is of advantage to add fining to the liquid under treatment to assist the formation of sedimentary matter, and to hasten the completion of the operation. It is also of advantage to pass the carbonic-acid gas used for impregnating through a filter of cotton-wool, or analogous device to avoid the introduction of detrimental organisms for even a short time. The air thus used should also be thoroughly purified.

The special advantages of my mode of purification as described are: that it is applicable to all liquids designated without a possibility of doing injury; that the liquids can be finished economically and in less time than they could be produced by ordinary methods in an unfinished and unstable condition; that none of the peculiar flavors which form the value of many of these articles are lost or disguised.

What I claim as new, and desire to secure by Letters Patent, is—

1. The process of accelerating and perfecting the purification of wine, beer, &c., for bottling and keeping purposes, by impregnating with carbonic-acid gas injected at or near the bottom under pressure of fifteen pounds to the square inch and upward, while the liquid is being agitated by mechanical means, by retaining the gas under the stated pressure in the liquid until the objectionable matter and organic impurities are rendered insoluble, and finally by removing these impurities from the liquids.

2. The process of accelerating and perfecting the purification of beer, wine, &c., vegetable juices, and decoctions in general, for bottling and storing and other purposes, consisting in impregnating the same with oxygen followed by impregnation with carbonic-acid gas under a pressure of upward of fifteen pounds over and above ordinary atmospheric pressure, retaining the gas under pressure in the liquid until the objectionable organic impurities are rendered insoluble, and then removing these impurities from the liquids, all substantially as described.

In testimony whereof I have hereunto set my hand in the presence of two subscribing witnesses.

R. D'HEUREUSE.

Witnesses:
  H. B. ZEVELY,
  DAVID H. MEAD.